(No Model.)
G. W. JOPSON.
PADLOCK.
No. 500,907. Patented July 4, 1893.
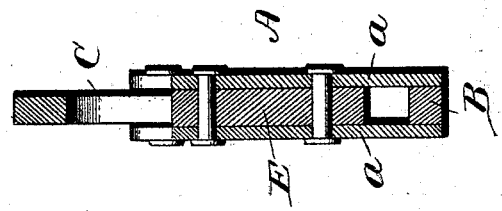
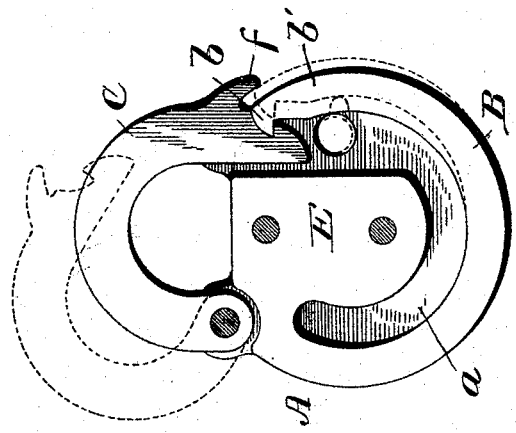
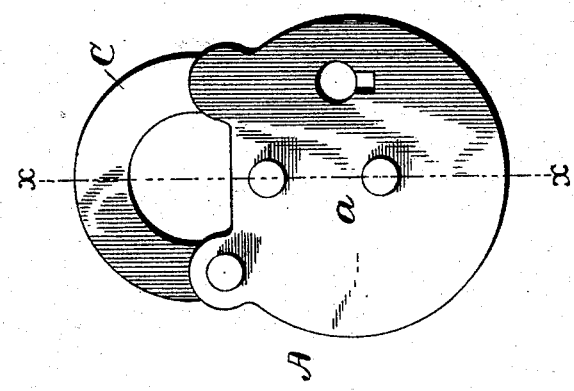
Witnesses
Albert Speiden
Van Buren Hillyard
Inventor
George W. Jopson,
By his Attorneys
R. S. & A. P. Lacey

UNITED STATES PATENT OFFICE.

GEORGE W. JOPSON, OF MERIDEN, CONNECTICUT.

PADLOCK.

SPECIFICATION forming part of Letters Patent No. 500,907, dated July 4, 1893.

Application filed June 18, 1892. Serial No. 437,190. (No model.)

*To all whom it may concern:*

Be it known that I, GEORGE W. JOPSON, a citizen of the United States, residing at Meriden, in the county of New Haven, State of Connecticut, have invented certain new and useful Improvements in Padlocks; and I do hereby declare the following to be a full, clear, and exact description of the invention, such as will enable others skilled in the art to which it appertains to make and use the same.

This invention relates to hasp or pad locks; and aims to improve and simplify the construction of this class of locks.

The object of the invention is to provide a lock that will combine as few parts as possible, and dispense with the use of separate dogs and springs to engage with the free end of the bow.

The improvement consists, essentially, of a case, a rim between and forming the sides of the case having one end free and elastic and adapted to engage with the free end of the bow, said bow being adapted to be released by means of a key.

The improvement also consists of the novel features and the peculiar construction and combination of the parts which will be hereinafter more fully described and claimed and which are shown in the annexed drawings, in which—

Figure 1 is a front view of a lock embodying my invention. Fig. 2 is a view similar to Fig. 1, the front half or part of the case being removed and showing the operation by dotted lines. Fig. 3 is a section on the line X—X of Fig. 1.

The case A comprising the two side pieces $a\ a$ and the rim B which is interposed between and closes the space between the said side pieces $a$, is of ordinary appearance. The bow C is pivoted at one end to the case in the usual manner and its opposite end is adapted to be engaged by the free end of the rim B which is constructed to interlock with and retain the bow C in a closed or locked position. The free end $b'$ of the rim B is constructed to yield outward as shown by the dotted lines in Fig. 2 and is provided with a hook $b$ to engage with a notch in the end of the bow C. The rim B comes flush with the edges of the sides $a\ a$ and is sufficiently elastic to yield when the proper key is thrust into the case and turned so that the nib thereon will press outward on the said rim and disengage it from the bow. The central portion E designed to come between the sides $a\ a$ and strengthen the same and receive the rivets which secure the said side pieces $a\ a$ and the portion E together, is an integral part of the rim B, the latter springing therefrom at one end. Obviously, the parts E and B may be separate and distinct elements, but for economy in construction it is preferred to have said parts E and B integrally formed as they may be struck from a piece of sheet metal and two rivets will suffice to firmly secure the parts $a\ a$ and B and E together. To give greater security to this lock the hook C may be provided at its free end with a projection $f$ which is constructed to extend over the hooked end of the rim B so as to prevent the ingress of an instrument between the end of B and the bow C. This projection will be so formed as not to interfere with the free workings of the rim B.

Having thus described my invention, what I claim, and desire to secure by Letters Patent, is—

1. In a pad lock, the combination of the case composed of side pieces, and a spring located between the said side pieces and forming the rim and having its free end constructed to engage with the free end of the bow, and the bow pivoted at one end and adapted to be engaged at the other end by the free end of said spring, substantially as described.

2. The herein described pad lock composed of the side pieces, a central portion and rim integrally formed and secured between the said side pieces, the free end of said rim being constructed to spring and engage with the bow, and a bow pivoted at one end between the said side pieces and adapted to have its free end engaged by the free end of the rim, substantially as described.

3. In a pad lock, the combination with the case comprising side pieces and a spring placed between the side pieces to form a rim, and having its free end constructed to engage with the bow, and having a bow pivoted at one end and adapted to be automatically engaged at the free end by the free end of the rim, and having a projection to extend over the free end of the said rim, substantially as described.

In testimony whereof I affix my signature in presence of two witnesses.

GEORGE W. JOPSON.

Witnesses:
E. C. BIRDSEY,
H. FARLEY.